(12) United States Patent
Hebert

(10) Patent No.: US 8,925,080 B2
(45) Date of Patent: Dec. 30, 2014

(54) DECEPTION-BASED NETWORK SECURITY USING FALSE POSITIVE RESPONSES TO UNAUTHORIZED ACCESS REQUESTS

(75) Inventor: Cedric Hebert, Mougins (FR)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 13/331,972

(22) Filed: Dec. 20, 2011

(65) Prior Publication Data

US 2013/0160079 A1  Jun. 20, 2013

(51) Int. Cl.
*H04L 29/06* (2006.01)
(52) U.S. Cl.
CPC .................................. *H04L 63/1491* (2013.01)
USPC .......................................................... 726/23
(58) Field of Classification Search
None
See application file for complete search history.

(56) References Cited

U.S. PATENT DOCUMENTS

| | | | |
|---|---|---|---|
| 6,038,315 A | 3/2000 | Strait et al. | |
| 6,151,593 A | 11/2000 | Cho et al. | |
| 7,161,468 B2 | 1/2007 | Hwang et al. | |
| 7,219,368 B2 | 5/2007 | Juels et al. | |
| 7,549,574 B2 | 6/2009 | Crowell | |
| 7,748,040 B2 | 6/2010 | Adelstein et al. | |
| 7,980,464 B1 | 7/2011 | Sarris et al. | |
| 8,468,598 B2 | 6/2013 | Hebert | |
| 2002/0046351 A1* | 4/2002 | Takemori et al. | 713/201 |
| 2003/0005287 A1* | 1/2003 | Wray et al. | 713/155 |
| 2004/0168069 A1* | 8/2004 | Knight | 713/186 |
| 2004/0255155 A1 | 12/2004 | Stading | |
| 2005/0204157 A1* | 9/2005 | Johnson | 713/200 |
| 2006/0059550 A1 | 3/2006 | Kausik | |
| 2006/0137012 A1 | 6/2006 | Aaron | |
| 2006/0218408 A1* | 9/2006 | Serpa | 713/183 |
| 2009/0328199 A1 | 12/2009 | Gilfix et al. | |
| 2012/0042364 A1 | 2/2012 | Hebert | |

OTHER PUBLICATIONS

Notice of Allowance for U.S. Appl. No. 12/857,066, mailed Mar. 6, 2013, 8 pages.
Non-Final Office Action for U.S. Appl. No. 12/857,066, mailed Jul. 25, 2012, 16 pages.
Non-Final Office Action Response for U.S. Appl. No. 12/857,066, filed Dec. 19, 2012, 13 pages.
Ateniese, et al, "Untraceable RFID Tags via Insubvertible Encryption", Proceedings of the 12th ACM Conference on Computer and Communications Securty, Nov. 2005, 10 pages.
Ateniese, et al, "Improved Proxy Re-encryption Schemes with Applications to Secure Distributed Storage", ACM Transactions on Information and System Security, vol. 9, No. 1, Feb. 2006, 30 pages.
Extended European Search Report for EP Application No. 09290182.6, mailed May 25, 2010, 9 pages.
Extended European Search Report for EP Application No. 12008286.2, filed Apr. 8, 2013, 8 pages.
Juels, et al, "Unidirectional Key Distribution Across Time and Space with Applications to RFID Security", 17th USENIX Security Symposium, Aug. 2008, 16 pages.

(Continued)

*Primary Examiner* — Gilberto Barron, Jr.
*Assistant Examiner* — Simon Kanaan
(74) *Attorney, Agent, or Firm* — Brake Hughes Bellermann LLP

(57) ABSTRACT

A request handler may receive an access request for access to application server resources of an application server and determine that the access request is unauthorized. A response manager may provide a false positive response including apparent access to the application server resources.

14 Claims, 4 Drawing Sheets

(56) References Cited

OTHER PUBLICATIONS

Kerschbaum, et al, "RFID-Based Supply Chain Partner Authentication and Key Agreement", Second ACM Conference on Wireless Network Security, Mar. 2009, 10 pages.

Lee, et al, "Detecting and Defending Against Web-Server Fingerprinting", Proceedings of the 18th Annual Computer Security Applications Conference (ACSAC'02), Dec. 9, 2002, 10 pages.

Liang, et al, "RFID System Security Using Identity-Based Cryptography", Ubiquitous Intelligence and Computing, Jun. 2008, 8 pages.

Saito, et al, "Enhancing Privacy of Universal Re-encryption Scheme for RFID Tags", LNCS, vol. 3207, Jul. 2004, 12 pages.

Weiler, "Honeypots for Distributed Denial of Service Attacks", Proceedings of the 11th International Workshops on Enabling Technologies: Infrastructure for Collaborative Enterprises (WETICE '02), Jun. 10, 2002, 6 pages.

* cited by examiner

DECEPTION-BASED NETWORK SECURITY USING FALSE POSITIVE RESPONSES TO UNAUTHORIZED ACCESS REQUESTS

TECHNICAL FIELD

This description relates to computer security.

BACKGROUND

Malicious and other illegitimate potential users of network computing resources may attempt to gain unauthorized access to such computing resources, using a variety of techniques. For example, such unauthorized users, sometimes referred to as hackers, may attempt to gain access to data or other resources which have been made available on the network in a manner intended to provide secure, confidential access to a limited set of authorized users. In particular examples, companies may provide public websites designed to interact with customers and potential customers, and hackers may attempt to modify such websites in undesired manners, and/or to modify or otherwise access confidential data used to support functionality of related websites. Meanwhile, current trends in network usage include greater usage of web-based/cloud-based applications, including the use of network-based data storage. Consequently, such trends provide increased high-value targets for hackers and other unauthorized users.

SUMMARY

According to one general aspect, a computer system may include instructions recorded on a computer-readable storage medium and readable by at least one processor. The system may include a request handler configured to cause the at least one processor to receive an access request for access to application server resources of an application server and to determine that the access request is unauthorized, and a response manager configured to cause the at least one processor to provide a false positive response including apparent access to the application server resources.

According to another general aspect, a computer-implemented method for causing at least one processor to execute instructions recorded on a computer-readable storage medium may include receiving an access request for access to application server resources of an application server. The computer-implemented method may further include determining that the access request is unauthorized; and providing a false positive response including apparent access to the application server resources.

According to another general aspect, a computer program product may be tangibly embodied on a computer-readable medium and may include instructions that, when executed, are configured to cause at least one processor to receive an access request for access to application server resources of an application server, determine that the access request is unauthorized, and provide a false positive response including apparent access to the application server resources.

The details of one or more implementations are set forth in the accompanying drawings and the description below. Other features will be apparent from the description and drawings, and from the claims.

DETAILED DESCRIPTION

Figure 1:
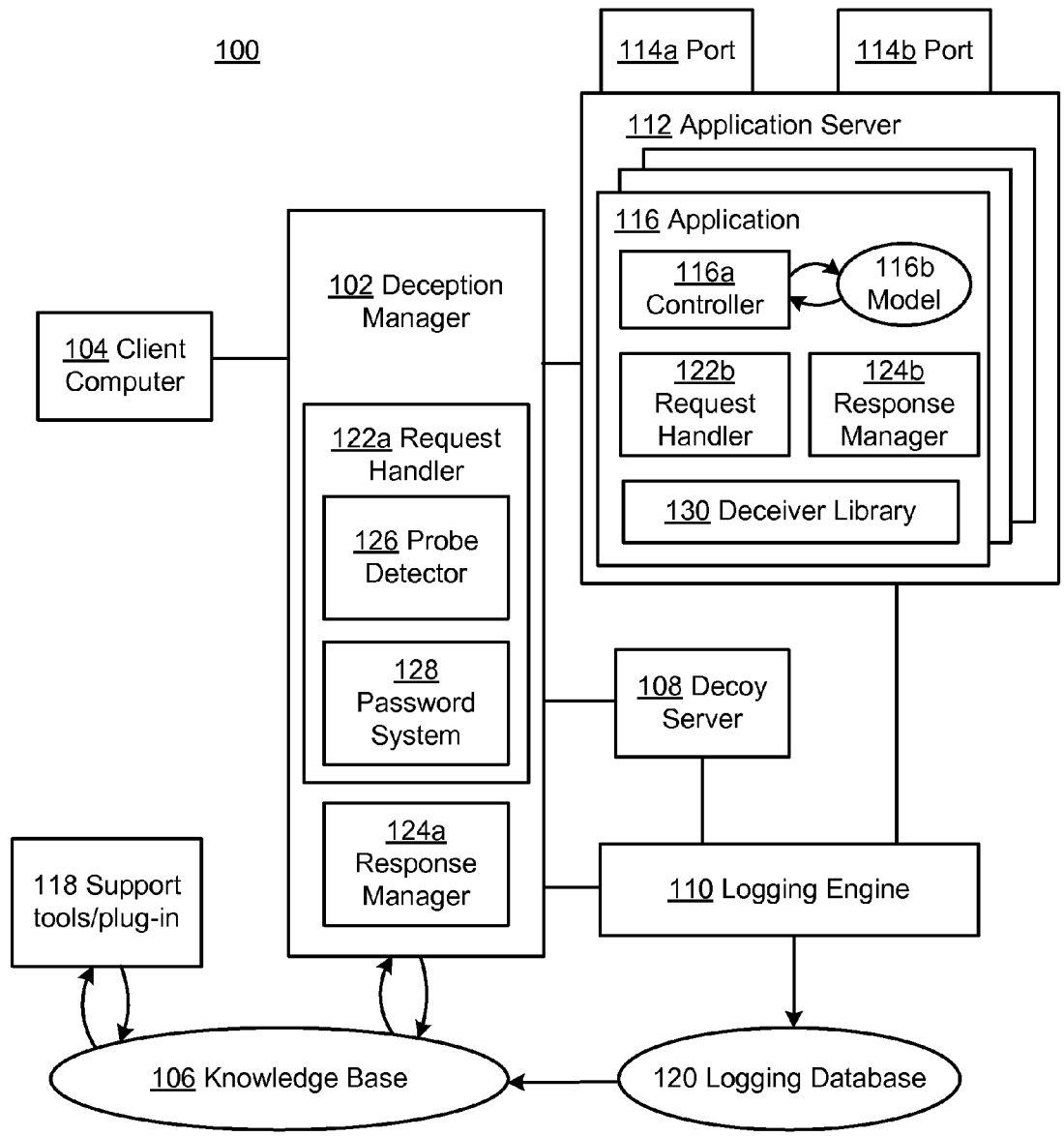
FIG. 1 is a system for providing false positive responses to potential unauthorized access requests.

FIG. 1 is a block diagram of a system 100 for providing false positive responses to potentially unauthorized access requests. By providing such false positive responses, the system 100 may deceive unauthorized users into believing, at least for a period of time, that their unauthorized access attempts have not been detected as such. Consequently, it may be more difficult (e.g., more time-consuming and/or more resource intensive) for unauthorized users to gain authorized access. Moreover, to the extent that the unauthorized users are deceived into believing that they have gained actual, desired access to system resources, the unauthorized users may be content with obtained results, and may cease, at least for the time being, further access attempts. Still further, to the extent that the unauthorized users are deceived into believing that they have gained desired, actual access, the unauthorized users may continue to interact with the falsely-provided resources, so that, for example, such interactions may be tracked by operators of the system 100, in order, e.g., to conduct legal proceedings against, or otherwise deter or stop, the unauthorized users.

In the example of FIG. 1, a deception manager 102 may be configured to interact with a client computer 104, where the client computer 104 may be understood to represent a source of access requests which may be malicious, unauthorized, or otherwise undesirable. As described in detail herein, the deception manager 102 may be configured to access a knowledge base 106 in order to determine whether, in fact, access requests received from the client computer 104 are malicious, unauthorized, or otherwise undesirable.

Further, the deception manager 102 may utilize the knowledge base 106 in conjunction with a decoy server 108, in order to thereby provide a deceptive false positive result to any such undesirable (or potentially undesirable) access request. As a result, as referenced above and as described in detail herein, illegitimate users of the client computer 104 may be deceived into believing that unauthorized access requests have been successful and/or have not been detected as such, while all along failing to achieve the desired unauthorized results. Consequently, such illegitimate users may be hindered or prevented from achieving such desired, unauthorized results, while legitimate users and/or providers may continue to receive desired access in a convenient manner, while experiencing limited or no inconveniences associated with the illegitimate access request received from the unauthorized users of the client computer 104.

In practice, it may be appreciated that the deception manager 102 and the client computer 104 may be in communications with one another using any suitable or relevant communication techniques. For example, the deception manager 102 and the client computer 104 may communicate over any suitable computer network, including a public network (e.g., the public internet, or secured portions thereof), or a private network (e.g., a corporate intranet).

For example, as described in more detailed examples below, the deception manager 102 may be associated with a plurality of network resources, and the deception manager 102 may represent, or be included in, a common point of entry for all access requests and other communications from external network devices, including the client computer 104. For example, in specific implementations, the deception manager 102 may be executed in the context of, in conjunction with, or as part of an otherwise conventional firewall device. Such firewall devices, by themselves, or generally well known to provide security-related functionality, including, e.g., encryption/decryption of data, username/password maintenance and management, and various other known functions related to maintaining a confidentiality, validity, and authorization of, or related to, communications between external network devices and underlying, backend network resources.

Thus, in the examples described herein, it is assumed that the client computer 104 has been configured to guess, deduce, or otherwise determine a proper form and/or content of an access request that might be authorized by the deception manager 102. For example, the client computer 104 may be configured to make repeated, random attempts to establish the form and content of such access requests, until, by process of elimination, a proper access request is determined. As described herein, the deception manager 102 may be configured to detect such unauthorized access requests, by providing a false positive result thereto, thereby deceiving the operator of the client computer 104 into believing that the unauthorized access request was successful.

In order to perpetuate this deception, the deception manager 102 may route the unauthorized access requests and subsequent communications from the client computer 104 to the decoy server 108, which may be configured to respond to the unauthorized access requests and subsequent communications in a manner which mimic actual communications that would have been provided by the illegitimately-requested network resource. As a result, the operator of the client computer 104 may continue to interact with the decoy server 108 for some period of time, until determining or guessing that the decoy server 108 represents a false positive, or until otherwise deciding to cease interactions with the decoy server 108. During such interactions, a logging engine 110 may be configured to record actions and other communications associated with the operator of the client computer 104. Accordingly, the system 100 may facilitate legal actions against the operator of the client computer 104. In other examples, as described in more detail below, the logging engine 110 may enable improved performance of the system 100 in future attempts to detect and respond to unauthorized access requests.

In the example of FIG. 1, an application server 112 is illustrated as an example of network resources which might be a target for unauthorized access by the operator of the client computer 104. As shown, and as is well known, the application server 112 may be associated with a plurality of ports, illustrated in the example of FIG. 1 as ports 114A, 114B.

Such ports may include or represent, for example, logical/virtual points of connection for direct communications between two applications, without requiring an intermediate file or other storage associated with an IP address of the host, as well as the type of protocol used for communication. The protocols that primarily use the ports are the Transport Layer protocols, such as the Transmission Control Protocol (TCP) and the User Datagram Protocol (UDP) of the Internet Protocol Suite. A port is identified for each address and protocol by a 16-bit number, commonly known as the port number.

Thus, the ports 114A, 114B may be configured to provide specific types of data connections such that each specific type of communication may be associated with one or more of the ports. In practice, individual ports may be associated with specific numbers designated as corresponding to specific types of network communications. For example, ports may be associated with FTP (file transfer protocol), telnet, or BGP (border gateway protocol), to name a few.

In practice, an operator of the application server 112 and/or the deception manager 102 may wish to utilize a subset of available ports for legitimate communications with a desired or intended audience. For example, out of hundreds or thousands of available ports, a dozen or more may be designated as being open so as to conduct legitimate communications. Consequently, in conventional scenarios, the remaining ports may be closed.

In the example of FIG. 1, the client computer 104 may be configured to execute port scanning software which scans all ports of the application server 112, in order to identify one or more of the subset of available ports which have been configured to be open for data communications. If successful in identifying such open ports, which would otherwise normally be available only to legitimate users notified of the availability thereof, the operator of the client computer 104 may proceed to execute unauthorized or undesired communications using the discovered-open ports.

In the example of FIG. 1, however, a second subset of ports, which are not needed for legitimate communications with an intended audience, may nonetheless be designated as being open for communications, in conjunction with operations of the deception manager 102. In this way, an operator of the client computer 104 utilizing port scanning software may believe that an open port has been discovered, when in fact the discovered and apparently open port represents a false positive provided by the deception manager 102 for purposes of deceiving the operator of the client computer 104 as described herein.

Thus, in the simplified example of FIG. 1, it may occur that the port 114A is designated as being open for legitimate communications in association with operations of the applications server 112, while the port 114B may not be required for such legitimate communications, but may nonetheless be falsely designated as open for purposes of deceiving the operator of the client computer 104. In such scenarios, then, the operator of the client computer 104 may scan all available ports, in an attempt to conduct unauthorized communications therewith.

Thus, in the example, if the port 114B is discovered, then the deception manager 102 may deduce or determine that any associated access request are unauthorized, and may therefore route such access requests and associated communications to the decoy server 108, which may be configured to mimic operations of the application server 112 and thereby deceive the operator of the client computer 104.

If the operator of the client computer 104 discovers that both ports 114A, 114B are apparently open, then the operator of the client computer 104 may nonetheless be unable to determine which of the ports represent an actual open port. Similarly, even if the operator of the client computer 104 initially discovers the open port 114A, then knowledge of the potential use of the deception manager 102 may cause the operator of the client computer 104 to doubt an authenticity of any subsequent communications with the application server 112.

Thus, by providing false positives in the form of apparently open (but actually closed) ports, the deception manager 102 may confuse or otherwise hinder the operator of the client computer 104, and may therefore cause such port-based attacks to be less fruitful for the operator of the client computer 104, and therefore less likely to occur and/or do harm. To the extent that the operator of the client computer 104 is deceived by the deception manager 102 and the decoy server

108 into continuing communications with the decoy server 108, the logging engine 110 may be utilized to track and record such interactions, so as to facilitate legal action and/or future deterrence efforts with respect to the operator of the client computer 104.

In additional examples, as shown, the application server 112 may be configured to execute an application 116. As is well known, the application 116 and the application server 112 may represent virtually any such application which may be made available over a network. For example, the application 116 may be associated with a commercial website designed for executing retail transactions over the public internet. In other examples, the application 116 may represent business software designed to support and otherwise facilitate operations of an enterprise. Of course, as referenced, many other examples of the application 116 exist, and would be well known to one of skill in the art.

As is also known, in addition to the network-level attacks referenced above with respect to the ports 114A, 114B, the client computer 104 may be configured to execute application-specific attacks against the application 116. For example, the application 116 may be protected through the use of authorized username/password combinations which are required to be entered by authorized users prior to providing certain types of access (e.g., administrative access) to the application 116. Consequently, somewhat similarly to the port-based scanning techniques described above, the client computer 104 may be configured to guess, deduce, or determine such username/password combinations (e.g., using random character combinations as part of a process of elimination), so as to thereby gain unauthorized access to operations of the application 116.

Various other types of application-level attacks may be launched by the client computer 104. For example, directory traversal attacks may be implemented in which resource locators (e.g., uniform resource locators or URLs, utilized in the context of an address bar of a conventional web browser) are manipulated by the client computer 104 in an attempt to guess an otherwise unavailable file or folder stored using the application 116 and/or the application server 112. In other words, the operator of the client computer 104 may traverse a directory structure of the application 116, and thereby identify resources which have not been made publicly available, and may therefore be thought to be safe from, or inaccessible by, unauthorized users.

For example, the application server 112 may provide a domain of websites and associated applications 116, many of which may be configured to publicly accessible, e.g., through the use of hyperlinks. At the same time, an operator or administrator of the application server 112 may include private webpages which may be used, e.g., for administration and management of the various related websites and applications, and/or for management of private data, e.g., customer data. Such non-public sites may be associated with specific, non-public uniform resource locators (URLs). For example, an example public webpage www.homepage.com may be associated with non-public webpages, e.g., www.homepage.com/customer_data or www.homepage.com/admin_page. BY virtue of trial and error processes, or other processes, an operator of the client computer 104 may enter, guess, or otherwise determine, using the base website name www.homepage.com, such pages which are designed and intended to be non-public. Subsequently, the operator of the client computer 104, in conventional systems, may thereafter be enabled to access or modify data in an illegitimate or unauthorized manner.

Various other types of illegitimate access requests and associated attack techniques may be implemented by the operator of the client computer 104. For example, as illustrated, the application 116 may include a conventional controller 116A and associated page model 116B. As is well known, the controller 116A may be understood to receive inputs from users, consult the page model 116B, and return desired information or functionality to the requesting user. In the context of the system 100, the operator of the client computer 104 may seek to hijack or otherwise utilize operations of the controller 116A and page model 116B in order to obtain desired, illegitimate results.

For example, in a technique referred to as client-side scripting (CSS), the operator of the client computer 104 may modify client-side scripts designed to be executed at the client computer 104, to thereby cause the client-side scripting to instead modify general operations of the controller 116A. In other words, the operator of the client computer 104 may use script design to be viewed and used only at the specific client computer 104 to affect operations of the application 116 as viewed and utilized by many or all other users thereof.

In other examples, it may occur that the page model 116B includes, or is associated with a database, such as a database managed using the popular structured query language (SQL). As is known, SQL is a popular database management language which enables users to modify (update, delete), maintain, or otherwise manage large relational databases. In these contexts, the operator of the client computer 104 may utilize a technique known as SQL injection to include SQL commands in otherwise normal interactions with the controller 116A. In other words, the operator of the client computer 104 may modify normal or expected user inputs to include illicit or unauthorized SQL commands, so that the controller 116A may thereafter execute the unauthorized SQL commands. For example, the operator of the client computer 104 may include an SQL command to delete an entire table of customer data from data associated with the model 116B. In this way, the operator of the client computer 104 may disrupt operators of the application 116, or otherwise gain unauthorized responses from the application 116.

In many cases, the various attack techniques referred above, and related attack techniques, may be associated with known software for performing the functions described above. For example, software known as John the Ripper is utilized to generate potential passwords in order to gain access to a password protected system. In the example of FIG. 1, such known attack software may be included in, or utilized in conjunction with, support tools/plug-ins 118. Specifically, as shown, the support tools/plug-ins 118 may be utilized by the knowledge base 106 in order to update and configure the knowledge base 106 for subsequent consultation thereof by the deception manager 102 when evaluating access requests from the client computer 104.

Further, as referenced above, the knowledge base 106 also may be updated based on information stored in a log-in database 120, which may be updated based on operations of the logging engine 110 during execution of monitoring and tracking interactions of the client computer 104 with the decoy server 108, as described herein. Thus, the login database 120 may be utilized by, or in conjunction with, the knowledge base 106, so as to maintain an updated version of the knowledge base 106 which is thereby configured to instruct the deception manager 102 in a timely and accurate fashion with respect to evaluations of access requests from the client computer 104.

Thus, in practice, a request handler 122A, 122B may be configured to receive access requests from the various computers, including the client computer 104. Specifically, with respect to the request handler 122A, as described herein, the deception manager 102 may be implemented in conjunction with, or as part of, a firewall device which is positioned on a network to receive all access requests destined for the applications server or other network resources. Consequently, the request handler 122A may be well-positioned to intercept or otherwise receive access requests from the client computer 104.

As described herein, the request handler 122A may consult with the knowledge base 106, in order to, e.g., determine that a given access request is unauthorized. Consequently, a response manager 124A may be configured to execute an appropriate response, including routing current feature communications from the client computer 104 originating an authorized request to the decoy server 108. For example, as described herein, the response manager 124A may be configured to execute in conjunction with, or as part of, a reverse proxy, which is conventionally used to perform load balancing and/or fail over functionality using a plurality of backend servers.

That is, for example, conventional websites may utilize a number of application servers to provide a single website, so that normal access requests may be routed among the various available servers in a balanced fashion, and/or may be handled appropriately even if one or more available servers fails. However, in the example of FIG. 1, the response manager 124B, as described herein, may be configured to utilize similar functionality for the purpose of routing the unauthorized access requests and subsequent communications from the client computer 104 to the decoy server 108, which is configured to mimic operations of the requested network resource, e.g., the application server 112.

In the example of FIG. 1, and consistent with the examples provided above, the request handler 122A may include a probe detector 126 which is configured to detect port scanning operations of the client computer 104 with respect to the ports 114A, 114B. For example, as described above, it may occur that the port 114A is configured to be open for purposes of legitimate data traffic, while the port 114B may not be required for legitimate data traffic, yet may be configured to be open nonetheless.

Subsequently, upon receipt of an access request with respect to the port 114B from the client computer 104, the probe detector 126 may determine, in conjunction with the knowledge base 106, that the port 114B has been configured to be open only for the purposes of deceiving the operator of the client computer 104 submitting the unauthorized access request. Similarly, the password system 128 of the request handler 122A may be configured to receive a false password from the client computer 104, and to thereby determine that the client computer 104 is attempting to gain unauthorized access, e.g., to the application 116. That is, for example, it may occur that the password system 128 may be configured to generate a number of false usernames and/or passwords in conjunction with, e.g., and addition to any actual, authorized username/password combinations which may exist with respect to the application 116.

Then, in such examples, it may be appreciated that actual users of the application 116 may submit their normal, authorized username/password combination in order to gain desired access to the application 116. At the same time, such authorized users may be unaware of the existence of a plurality of false username/password combinations, which exist only to deceive the operator of the client computer 104 into believing that a desired, unauthorized access to the application 116 has been achieved.

Thus, in conjunction with both the probe detector 126 and the password system 128, it may be appreciated that the request handler 122A may be configured to determine an unauthorized nature of an authorized access request received from the client computer 104. Thereupon, the response manager 124 may be configured to route the unauthorized access request and subsequent communications to the decoy server 108, as described herein.

In many cases, however, the request handler 122A may mistakenly identify an unauthorized access request as being authorized and permissible. Similarly, the request handler 122A may come to an indeterminate result in its attempt to classify a specific access request as authorized or unauthorized.

In particular, with respect to the case of application-level attacks referenced above, including, e.g., directory traversal attacks, client-side scripting attacks, and/or SQL injection attacks, it may be difficult or impossible for the request handler 122A located at the deception manager 122 to identify an unauthorized nature of such access requests, and related access requests.

In particular, such types of access requests may be particular to a context of the application 116 itself, and therefore may be difficult or impossible to detect at a network level by the deception manager 102. Then, in the example of FIG. 1, a deceiver library agent 130 may be configured to identify the access request as being unauthorized, in conjunction with the request handler 122B. For example, a number of known techniques exist for detecting SQL injection attempts, and the various other application-level attacks described above, and related attack types. For example, input validation and sanitization techniques exist which enable detection of embedded SQL commands, so that associated user inputs may be sanitized (i.e., may have the offending SQL injection attempts removed, or have the entirety of the associated user input dropped).

In the example of FIG. 1, however, rather than dropping sanitized user inputs, the response manager 124B, in conjunction with the deceiver library 130, may be configured to recognize unauthorized access requests associated with the types of attacks described above, and thereafter inform the response manager 124A of the deception manager 102 to route the unauthorized access requests and subsequent communications from the client computer 104 to the decoy server 108.

Thus, the system 100 may be configured to send false success responses for code areas which are normally out of bounds of firewalls or intrusion detection systems. This allows, for example, for sending a response code in response to directory traversals, which may thereby confuse attackers, and render their attack methods useless. Similarly, the decoy server 108 may be utilized to pretend that a received SQL injection was successful, while not breaking the normal behavior of the application 116 in conjunction with separate, legitimate access requests.

FIG. 1 illustrates an example block diagram of a system 100, in which the various functional blocks are illustrated and described as shown. Of course, it may be appreciated that the system 100 of FIG. 1 is intended merely for the sake of an example, and that many additional or alternative implementations may be provided.

For example, components illustrated at one location in the example of FIG. 1 may be implemented, in whole or in part, at a different location thereof. In general, any single component of the example of FIG. 1 may be executed using two or more components which each perform a corresponding subset of functionalities of the singular, illustrated components.

Similarly, but conversely, any two or more of the components of FIG. 1 may be executed using a single component.

Figure 2:
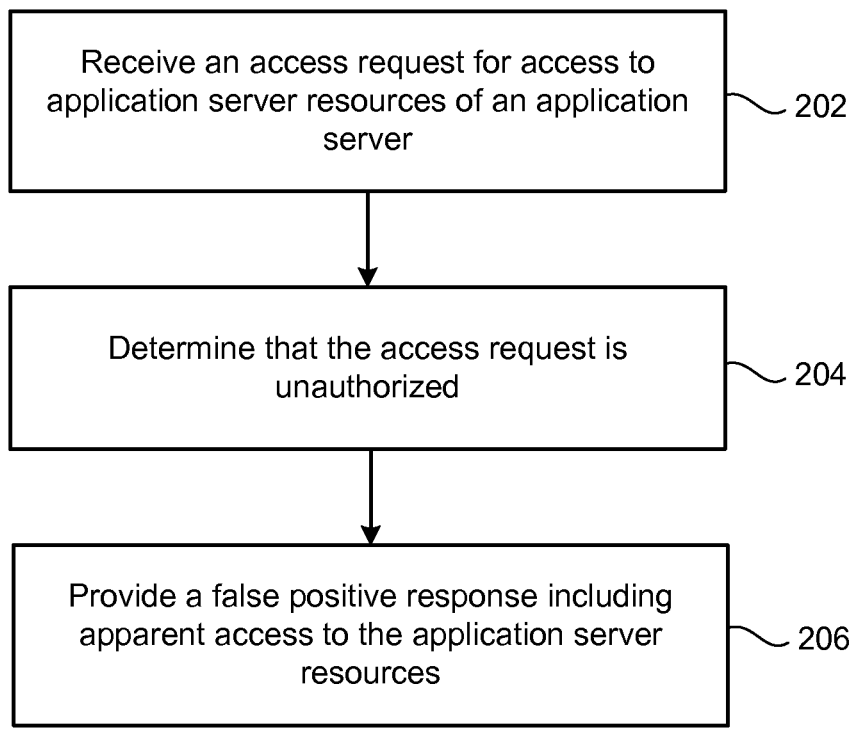
FIG. 2 is a flowchart illustrating example operations of the system of FIG. 1.

FIG. 2 is a flowchart 200 illustrating example operations of the system 100 of FIG. 1. In the example of FIG. 2, operations 202-206 are illustrated as separate, sequential operations. However, it may be appreciated that additional or alternative implementations, the operations 202-206 may be performed in a partially or completely overlapping or parallel manner, and/or may be implemented in a nested, iterative, or looped fashion. Moreover, additional or alternative operations may be included, while one or more operations may be deleted.

In the example of FIG. 2, an access request for access to application server resources of an application server may be received (202). For example, the request handler 122A, 122B may receive such an access request with respect to the application 116 of the application server 112, and/or with respect to the various ports 114A, 114B associated therewith. For example, the probe scanner 126 may receive a port request from the client computer 104 for access to the closed 114B. Similarly, the password system 128 may receive a false username/password from the client computer 104. Still further, the request handler 122B may receive an access request with respect to the application 116 which is part of a directory traversal attack, client-side scripting attack, or SQL injection attack.

The access request may be determined to be unauthorized (204). For example, the request handlers 122A, 122B, or components thereof, may consult with the knowledge base 106 to determine that a given access request is unauthorized. For example, the probe scanner 126 may consult the knowledge base 106 to determine that the requested port (e.g., port 114B), is open only for purposes of deceiving unauthorized users. Similarly, the password system 128 may operate in conjunction with the knowledge base 106 and the associated support tools/plug-ins 118 which may provide information useful in identifying receipt of false passwords. Still further, the request handler 122B at the application 116 may determine that the access request is associated with a directory traversal attack, client-side scripting attack, or SQL injection attack, in conjunction with the deceiver library agent 130.

A false positive response including apparent access to the application server resources may be provided (206). For example, as described, the response manager 124A, 124B may be configured to route the unauthorized access request and subsequent communications from the client computer 104 to the decoy server 108. As described, in conjunction with any of the port scanning attacks, password cracking attacks, and various application-level attacks, the decoy server 108 may be configured to deceive the operator of the client computer 104 into believing that he or she has access to the desired application resources. Consequently, as described, the logging engine 110 may be configured to track and monitor interactions of the operator of the client computer 104 with the decoy server 108, so as to assist in future deterrence of the same or future attackers, or for instituting legal or other action against the operator of the client computer 104.

Figure 3:
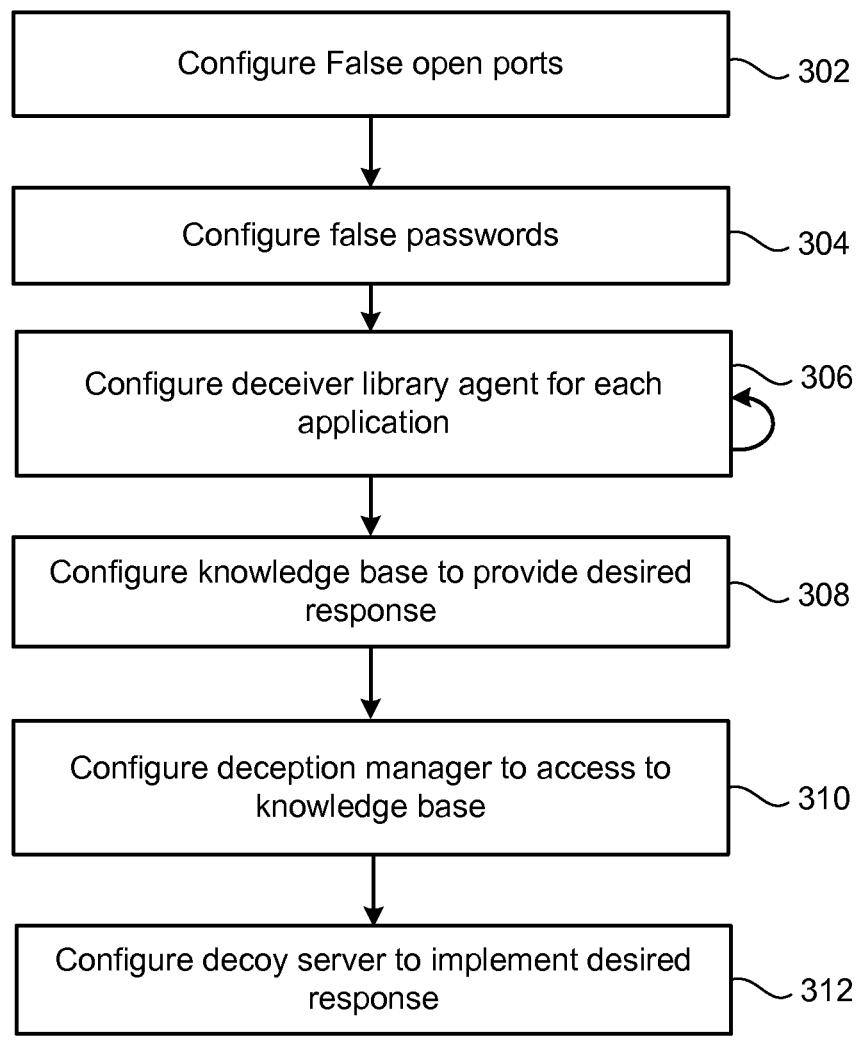
FIG. 3 is a flowchart illustrating example operations related to example configurations of the system of FIG. 1.

FIG. 3 is a flowchart 300 illustrating example operations associated with configuring the system 100 of FIG. 1. Thus, the example of FIG. 3 illustrates actions which might be taken by an operator or administrator of the deception manager 102, the application server, and/or various other components of the system 100 in communication with the client computer 104.

In the example of FIG. 3, false open ports may be configured (302). For example, as described, the port 114B, which is not desired or needed for actual, authorized network communications, may nonetheless be designated as open for purposes of deceiving the operator of the client computer 104. As referenced above, a number of available ports associated with the application server 112 may range, for example, in the hundreds or thousands. Consequently, it may be desirable to determine a number or percentage of closed ports to be designated as open. For example, during legitimate operations with the application server 112, it may occur that only a small number of available ports are desired for the authorized operations of the application server 112. Then, an operator or administrator of the system 100 may decide a number or percentage of the remaining ports to be designated as being open.

In this regard, inasmuch as it may be appreciated that the goal of the deception manager 102 is to deceive the operator of the client computer 104 with respect to mimicking of the application server 112 by the decoy server 108. Therefore, it may not be desirable to designate all closed ports as being open, since, or to the extent that it is unusual to open all ports in conjunction with operations of the application server 112. Rather, the number of ports to be left open might be selected based on a desire to flood the operator of the client computer 104 with erroneous results, while at the same time not alerting the operator of the client computer 104 to the presence of such deception by simply opening all available ports.

False passwords may be configured (304). For example, as described above, the knowledge base 106 may interact with the support tools/plug-ins 118 to determine the types of passwords which might be selected by the operator of the client computer 104 in attempting to gain access to the application 116. In additional or alternative examples, the password system 128 may be configured to generate false passwords which are related to, or similar to, actual passwords of authorized users.

Additionally, it may occur that network administrators and other users of the application 116 may be prone to use certain standard passwords, for the sake of convenience, but at the cost of potentially providing access to attackers such as the operator of the client computer 104. For example, many administrators might utilize a word such as "administrator" or "password" for use as a password. Consequently, the password manager 128 may be configured to receive access requests from the operator of the client computer 104 in conjunction with such standard passwords, used in the example by the password manager 128 as false passwords designed to deceive the operator of the client computer 104 into interacting harmlessly with the decoy server 108. In order to avoid denying access to legitimate users, however, the password manager 128 may consult the knowledge base 106 or other appropriate resource in order to consider the possibility that such standard passwords have been utilized by an authorized user (i.e., even in cases where these passwords have been stored as potential false passwords). In such cases, the password manager 128 may consider the received password to be legitimate for purposes of granting the immediate access request, but may instruct the request handler 122b of the application 116 to more carefully inspect subsequent application-related requests for potential unauthorized activity.

The deceiver library agent 130 may be configured for each application (306). That is, as referenced above, the request handler 122B, the response manager 124B, and the deceiver library agent 130 may be desired or required to be implemented in the context of the corresponding specific application. For example, such implementations may be desired or necessary when using otherwise conventional tools to detect the types of attacks referenced above.

The knowledge base 106 may be configured to provide a desired response (308). For example, as referenced above, the response manager 124 may be configured to consult the knowledge base 106 in order to determine a desired response in addition or alternative to the rerouting of communications of the operator of the client computer 104 to the decoy server 108. For example, the knowledge base 106 may be configured to designate a false positive response on the part of the deception manager 102 including a return message to the operator of a client computer 104 that access has been granted but delayed due to certain specified or un-specified reasons. In other words, the knowledge base 106 may be configured to cause the response manager 124A to provide a false positive response in addition or alternative to rerouting of the unauthorized access requests and associated communications to the decoy server 108. As referenced above with respect to FIG. 1, the plug-in/support tools 118 may be used by the knowledge base 106 to maintain current, up-to-date techniques for monitoring access requests and responding thereto.

The deception manager may be configured to access the knowledge base (310). For example, the request handler 122A and the response manager 124A may be configured to utilize one or more appropriate application programming interfaces (APIs) to access the knowledge base 106. The decoy server 108 may be configured to implement a desired response (312). For example, as described, the decoy server 108 may be configured to mimic the application 116 or other desired application resource. Consequently, the experience of the operator of a client computer 104 may be entirely consistent with an experience of interacting directly with the application 116.

As a result, any illicit, illegal, or other undesired behavior may be observed in the context of the decoy server 108. Of course, in example implementations, the decoy server 108 may be configured to provide various inconveniences to the operator of a client computer 104 in illegal or otherwise improper communications with the decoy server 108. Thus, the decoy server 108 need not mimic the application 116 exactly, but, rather, may be configured to act in ways which inconvenience the operator of the client computer 104, and/or which encourage the operator of the client computer 104 to continue interacting with the decoy server 108, so that the logging engine 110 may execute its desired purpose.

Figure 4:
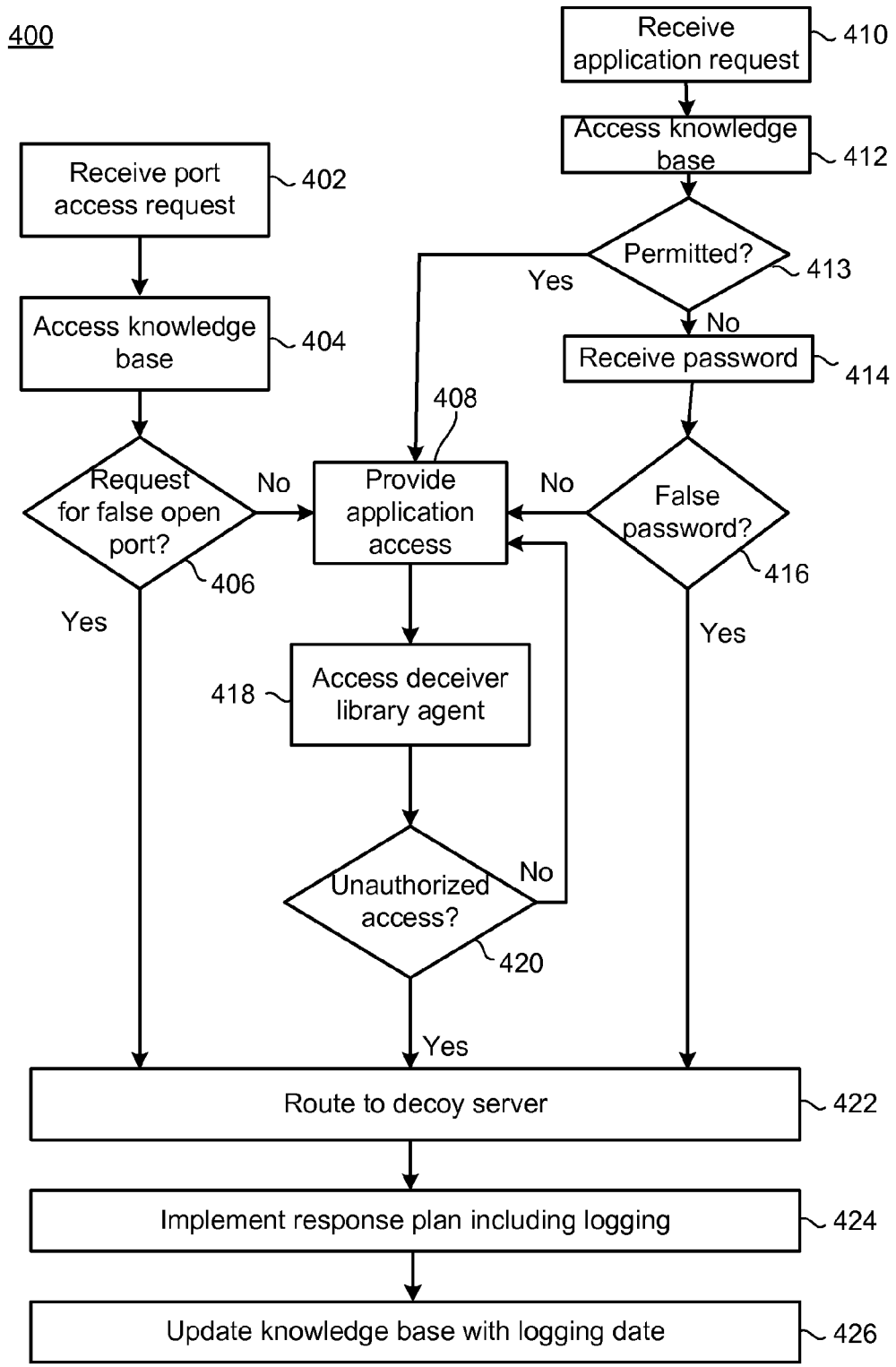
FIG. 4 is a flowchart illustrating example implementations of executions of the system of FIG. 1.

FIG. 4 is a flowchart 400 illustrating example executions of the system 100 of FIG. 1. In the example of FIG. 4, a port access request may be received (402). For example, the probe scanner 126 may receive a request from the client computer 104 for either the port 114A or the port 114B. For the case where the access request is, with respect to the port 114B, the probe scanner 126 may determine that the access request is for a falsely or deceptively open port, and may therefore route the request and subsequent communications from the client computer 104 to the decoy server 108 (422). Otherwise, if the access request is with respect to the legitimately open port 114A, then the client computer 104 may be provided with access to the application 116 (408).

Similarly, the request handler 122A, e.g., the password system 128, may receive a request for access to the application 116 or other network resources (410). The password system 128 may access the knowledge base 106 (412), in order to judge a legitimacy of the access request. If permitted (413), application access may be granted. Otherwise (413), if the application is protected by the password system 128 (410), then upon receipt of a username/password combination (414), the password system 128 may determine whether the received password represents a false password (416).

If so, the password system 128 may route the access request and subsequent communications from the client computer 104 to the decoy server 108 (422). Otherwise, as referenced above, it may be difficult for the request handler 122A, even in conjunction with the knowledge base 106, to determine whether application-specific requests are legitimate or not. Consequently, as described above, the request handler 122A may provide initial access to the application 116 (408), while at the same time ensuring operations of the request handler 122B and the deceiver library agent 130 with respect to the access request.

Specifically, the request handler 122B may receive the access request and access the deceiver library agent 130 (418), so as to thereby determine whether the access request is unauthorized (420). If no such determination is made, then application access may continue to be provided (408).

Otherwise, as described, it may occur that the request handler 122B, in conjunction with the deceiver library agent 130, may determine that the access request is associated with one or more types of attacks referenced above, e.g., directory traversal attacks, client-side scripting attacks, or SQL injection attacks. In such cases, the response manager 124B may route current and future access requests with respect to the application 116 back to the response manager 124A at the deception manager 102, for routing thereof to the decoy server 108 (422).

Subsequently, the preconfigured response plan for any of the above-referenced types of attacks may be implemented (424). For example, the logging engine 110 may be configured to monitor and track interactions between the client computer 104 and the decoy server 108, and to thereby update log-in data 120 accordingly. As also described, various other actions, including legal actions and/or warnings or other messages to the client computer 104, also may be implemented. In some implementations, the logging data 120 may be utilized to update the knowledge base 106 (426), so as to thereby maintain the knowledge base 106 using current, up-to-date information regarding existing attack techniques.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and readable by at least one processor, the system comprising:
    a deception manager configured to cause the at least one processor to detect an attack on an application server, the deception manager being implemented at a firewall associated with the application server, the deception manager including,
        a first request handler configured to receive an access request for access to application server resources of the application server from a computer, the access request being related to a port among a plurality of available ports associated with the application server, the plurality of available ports including at least one port configured as an unauthorized port and at least one port configured as an authorized port, the first request handler configured to determine whether the access request is unauthorized including determining whether the port associated with the access request is the unauthorized port or the authorized port using a knowledge base;
        a first response manager configured to provide a false positive response to the computer if the port associated with the access request is determined as the unauthorized port, the false positive response indicating that the unauthorized port is open for legitimate communication to the application server, the first response manager configured to re-route access to the application server resources to a decoy server configured to mimic an appearance and function of the requested application server resources;
    a deceiver library agent configured to detect an application-level attack on an application associated with the application server, the deceiver library agent being implemented on the application server, the deceiver library agent including,
        a second request handler configured to subsequently determine whether the access request is unauthorized if the first request handler determines that the access request is authorized including determining whether the access request is associated with at least one application-level attack, the at least one application-level attack including a directory traversal attack, a client-side scripting attack, or a structured query language (SQL) attack, the access request including input data corresponding to the at least one application-level attack;
        a second response manager configured to instruct the first request handler to re-route the access request and subsequent communications from the computer to the decoy server when the access request is determined an unauthorized by the second request handler such that input validation or sanitization techniques are not applied to the input data; and
    a logging engine configured to monitor and store interactions of the computer with the decoy server in a logging database, the logging engine configured to update the knowledge base based on the stored interactions in the logging database such that an updated version of the knowledge base is maintained for use in determining whether a subsequent access request is unauthorized.

2. The computer system of claim 1, wherein the second response manager is configured to transmit a false positive providing a response code in response to a directory traversal of the directory traversal attack.

3. The computer system of claim 1, wherein the first request handler and the first response manager are configured to utilize one or more application programming interfaces (APIs) to access the knowledge base.

4. The computer system of claim 1, further comprising:
    at least one support tool configured to update the knowledge base such that the knowledge base includes up-to-date information regarding existing attack techniques.

5. The computer system of claim 1, wherein the first request handler is also configured to store a plurality of false passwords in the knowledge base, the first request handler being configured to determine whether the access request is unauthorized by determining that a password associated with the access request corresponds to at least one of the plurality of false passwords stored in the knowledge base, the first response manager being configured to transmit a false positive to the computer and re-route the access request to the decoy server when the first request handler determines that the password associated with the access request corresponds to the at least one false password.

6. The computer system of claim 5, further comprising:
    at least one support tool configured to generate a plurality of potential false passwords to gain access to the application and update the knowledge base with one or more of the potential false passwords.

7. The computer system of claim 1, wherein the deception manager is implemented at a common entry point for all access requests and other communications from external network devices, the external network devices including the computer.

8. The computer system of claim 1, wherein the at least one port configured as the unauthorized port includes a plurality of open unauthorized ports, and the at least one port configured as the authorized port includes a plurality of open authorized ports, the plurality of open unauthorized ports representing false positives.

9. The computer system of claim 1, wherein the first response manager is configured to execute as a reverse proxy to re-route the unauthorized access request to the decoy server.

10. A computer-implemented method for causing at least one processor to execute instructions recorded on a non-transitory computer-readable medium, the method comprising:
 detecting, by a deception manager, an attack on an application server, the deception manager being implemented at a firewall associated with the application server, the detecting including,
  receiving, by a first request handler, an access request for access to application server resources of the application server from a computer, the access request being related to a port among a plurality of available ports associated with the application server, the plurality of available ports including at least one port configured as an unauthorized port and at least one port configured as an authorized port;
  determining, by the first request handler, whether the access request is unauthorized using a knowledge base including determining whether the port associated with the access request is the unauthorized port or the authorized port using the knowledge base;
  providing, by a first response manager, a false positive response to the computer if the port associated with the access request is the unauthorized port, the false positive response indicating that the unauthorized port is open for legitimate communication to the application server;
  re-routing, by the first response manager, access to the application server to a decoy server configured to mimic an appearance and function of the requested application server resources;
 detecting, by a deceiver library agent, an application-level attack on an application associated with the application server, the deceiver library agent being implemented on the application server, the detecting including,
  determining, by the deceiver library agent, whether the access request is unauthorized if the first request handler determines that the access request is authorized including determining whether the access request is associated with at least one application-level attack, the at least one application-level attack including a directory traversal attack, a client-side scripting attack, or a structured query language (SQL) attack, the access request including input data corresponding to the at least one application-level attack;
  instructing, by the deceiver library agent, the first request handler to re-route the access request and subsequent communications from the computer to the decoy server when the access request is determined as unauthorized by the deceiver library agent such that input validation or sanitization techniques are not applied to the input data;
 monitoring and storing interactions of the computer with the decoy server in a logging database; and
 updating the knowledge base based on the stored interactions in the logging database such that an updated version of the knowledge base is maintained for use in determining whether a subsequent access request is unauthorized.

11. The computer-implemented method of claim 10, further comprising:
 storing a plurality of false passwords in the knowledge base;
 determining, by the first request handler, whether the access request is unauthorized by determining that a password associated with the access request corresponds to at least one of the plurality of false passwords stored in the knowledge base; and
 transmitting a false positive to the computer and re-routing the access request to the decoy server when the password associated with the access request is the at least one false password.

12. A computer program product, the computer program product being tangibly embodied on a non-transitory computer-readable medium and comprising instructions that, when executed, are configured to cause at least one processor to:
 detect, by a deception manager, an attack on an application server, the deception manager being implemented at a firewall associated with the application server, the detect including,
  receive, by a first request handler, an access request for access to application server resources of the application server from a computer, the access request being related to a port among a plurality of available ports associated with the application server, the plurality of available ports including at least one port configured as an unauthorized port and at least one port configured as an authorized port;
  determine, by the first request handler, whether the access request is unauthorized using a knowledge base including determining whether the port associated with the access request is the unauthorized port or the authorized port using the knowledge base; and
  provide, by a first response manager, a false positive response to the computer if the port associated with the access request is the unauthorized port, the false positive response indicating that the unauthorized port is open for legitimate communication to the application server;
  re-route, by the first response manager, access to the application server to a decoy server configured to mimic an appearance and function of the requested application server resources;
 detect, by a deceiver library agent, an application-level attack on an application associated with the application server, the deceiver library agent being implemented on the application server, the detect including,
  determine, by the deceiver library agent, whether the access request is unauthorized if the first request handler determines that the access request is authorized including determine whether the access request is associated with at least one application-level attack, the at least one application-level attack including a directory traversal attack, a client-side scripting attack, or a structured query language (SQL) attack, the access request including input data corresponding to the at least one application-level attack;

instruct, by the deceiver library agent, the first request handler to re-route the access request and subsequent communications from the computer to the decoy server when the access request is determined an unauthorized by the deceiver library agent such that input validation or sanitization techniques are not applied to the input data;

monitor and store interactions of the computer with the decoy server in a logging database; and update the knowledge base based on the stored interactions in the logging database such that an updated version of the knowledge base is maintained for use in determining whether a subsequent access request is unauthorized.

13. The computer program product of claim 12, further comprising:

store a plurality of false passwords in the knowledge base;

determine, by the first request handler, whether the access request is unauthorized by determining that a password associated with the access request corresponds to at least one of the plurality of false passwords stored in the knowledge base;

transmit a false positive to the computer and re-route the access request to the decoy server when the password associated with the access request is the at least one false password.

14. The computer program product of claim 13, wherein the instructions, when executed, are configured to cause the at least one processor to implement at least one support tool, the at least one support tool configured to generate a plurality of potential false passwords to gain access to the application and update the knowledge base with one or more of the potential false passwords.

\* \* \* \* \*